United States Patent [19]

Hill et al.

[11] Patent Number: 5,068,078
[45] Date of Patent: Nov. 26, 1991

[54] PARISON LUBRICATION METHOD

[75] Inventors: Gary Hill, Kansas City, Mo.; Walter K. Schoch, Peachtree City, Ga.; Michael Warkentien, Independence, Mo.

[73] Assignee: Sewell Plastics, Inc., Atlanta, Ga.

[21] Appl. No.: 535,702

[22] Filed: Jun. 11, 1990

Related U.S. Application Data

[62] Division of Ser. No. 284,171, Dec. 14, 1988, abandoned.

[51] Int. Cl.$^5$ .................. B29C 49/00; B29C 49/20
[52] U.S. Cl. .................. 264/512; 264/130; 264/134; 264/513; 425/90; 425/93; 425/522; 425/DIG. 115; 427/256; 427/428; 427/429; 427/430.1
[58] Field of Search .......... 264/516, 129, 130, 134, 264/523, 512, 513; 427/256, 393.5, 428, 429, 430.1; 425/90, 93, 522, DIG. 115

[56] References Cited

U.S. PATENT DOCUMENTS

| 1,662,086 | 3/1928 | Stuhr | 118/260 |
| 4,478,889 | 10/1984 | Maruhashi et al. | 427/393.5 |
| 4,499,045 | 2/1985 | Obsomer | 264/535 |
| 4,525,377 | 6/1985 | Nickel et al. | 427/430.1 |
| 4,534,995 | 8/1985 | Pocock et al. | 427/430.1 |
| 4,543,277 | 9/1985 | Giles | 427/430.1 |
| 4,550,008 | 10/1985 | Shimizo | 264/130 |

FOREIGN PATENT DOCUMENTS 227624 8/1984 German Democratic Rep. .
966009 8/1964 United Kingdom ........... 427/428

Primary Examiner—Jan H. Silbaugh
Assistant Examiner—Catherine Timm
Attorney, Agent, or Firm—Locke Reynolds

[57] ABSTRACT

A method for enhancing the uniformity of wall thickness of an article having a high aspect ratio horizontal cross section and produced from a parison in a blow molding process whereby a barrier layer is applied to a selected area of the outer surface of each parison prior to its introduction into the blow molding apparatus, the barrier layer being effective to prevent premature freezing of the blown parison upon contact with a wall of the blow molding apparatus. The barrier layer application apparatus includes a generally contoured pad coupled to a supply of the barrier material, the pad being situated to contact a selected portion of each parison prior to its introduction into the blow molding apparatus.

8 Claims, 2 Drawing Sheets

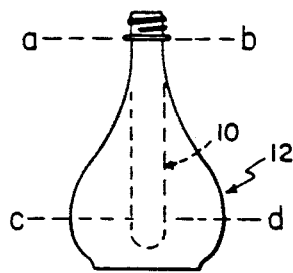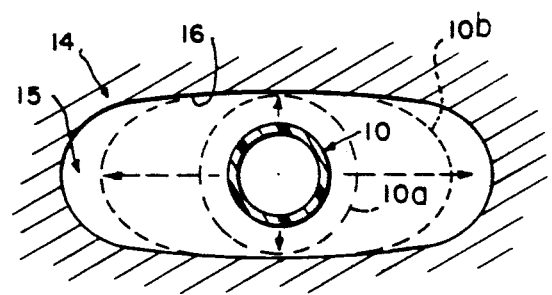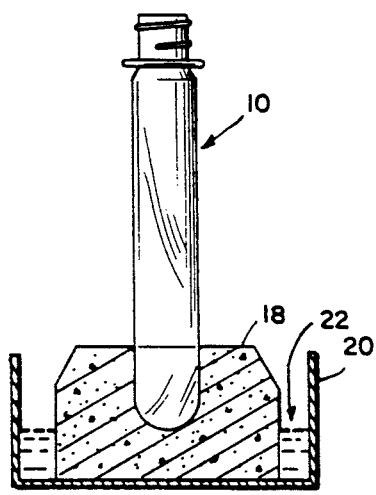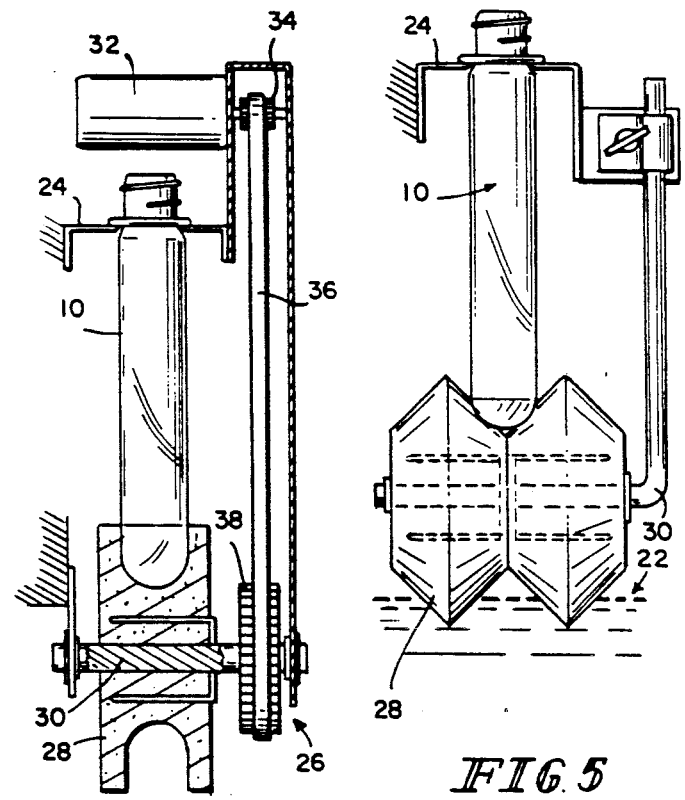

PARISON LUBRICATION METHOD

CROSS-REFERENCE TO RELATED APPLICATION

This application is a divisional of application Ser. No. 07/284,171 filed Dec. 14, 1988 now abandoned.

BACKGROUND OF THE INVENTION

This invention relates to a method for the lubrication of a parison for use in a blow molding process. Utilization of the present invention permits blow molding of containers having elliptical horizontal cross sections that have a high aspect ratio.

The production of containers through the use of a blow molding process is widely practiced in the container manufacturing industry. The first step in this process consists of extruding or, preferably, injecting a molten substance into a mold cavity. Upon hardening, a thick walled hollow object commonly known as a preform or a parison is produced. This parison is then brought to a temperature conducive to blow molding and placed in a blow mold. A high pressure gas or mixture of gasses such as air is then injected into the interior of the parison, causing the parison to rapidly expand until it contacts the walls of the blow mold cavity. The final form of the container is produced by the walls of the blow mold cavity cooling the substance and preventing further expansion of the substance.

Many substances can be used in a blow molding process, but glass and thermoplastics are most commonly used in the container manufacturing industry. High density polyethylene, polypropylene, and polyvinyl chloride based plastics are all suitable for use in a blow molding process. For some thermoplastics, such polyethylene terepthalate, an additional step of biaxially orienting the thermoplastic by stretching the parison can provide superior clarity, drop resistance, and tensile strength to the finished product.

However, blow molding is not an ideal method for producing certain types of finished articles that have shapes whose cross section is not substantially circular. Containers having elliptical cross sections of high aspect ratio are difficult to produce using this method because the parison walls freeze against the mold walls upon contact, stopping any flow of material from the frozen areas of the parison to those areas of the parison that are still expanding due to air pressure. As a result, the walls of the container are abnormally thick in those areas that first contact the mold near the minor axis of the mold, and abnormally thin in those areas near the major axis of the mold.

A further problem is the migration of the crystallized plastic sprue point when thermoplastics such as polyethylene terepthalate are used. When the parison is injection molded, the plastic nearest the injection sprue is abnormally hot compared to the rest of the plastic. The heat in the sprue area causes polyethylene terepthalate to crystallize into a more brittle form. This crystallized plastic, sometimes known as a sprue artifact, constitutes an unavoidable weak point in the finished product. However, the possibility of failure at the point of crystallization represented by the sprue artifact can be minimized by appropriate design of the finished product. If the sprue artifact is centered at the bottom of the finished product, and protected from direct contact with other objects by raised ridges or feet, the possibility of failure due to impact is signnificantly reduced.

When products having a substantially circular cross section are blow molded, the sprue artifact remains generally centered in a protected position because the blown parison nearly simultaneously contacts the walls of the blow mold cavity. However, if the mold has a high aspect ratio elliptical horizontal cross section, the sprue artifact can migrate to areas outside the protective structures due to non-uniform thinning caused by freezing of the plastic to the mold walls. If the sprue artifact migrates outside of the protected area, the finished product is useless because of the high risk of stress induced container failure at the sprue artifact point.

Several methods have unsuccessfully been attempted to remedy the problem of wall thinning and migration of the sprue artifact. Varying blow pressures, changing mold temperatures and changing mold profiles have failed to alleviate the problems associated with blow molding containers having a high aspect ratio elliptical, horizontal cross sections. More substantial changes, such as forming a blow mold from nickel impregnated with a slippery fluorocarbon compound such as Teflon have also failed to prevent wall thinning due to premature freezing contact with the mold walls. Other alternatives such as designing preforms with elliptical shapes could work in certain situations, but the cost of retooling to handle and properly orient variant shapes can be prohibitive, especially when low volume or marginally profitable production runs are contemplated.

SUMMARY OF THE INVENTION

The present invention provides a method for preventing the premature freezing contact of a blown parison with the walls of the mold cavity, thereby reducing the differences in wall thickness and sprue artifact migration caused by the freezing contact. This is accomplished by the addition of a barrier layer between the walls of a mold cavity and a parison. The barrier layer prevents the premature cooling and consequent freezing of the parison material to the walls of the mold cavity, and permits the continued flow of material toward the expanding sections of a blown parison.

Many barrier materials are suitable for use in this invention. A barrier material should not significantly interact chemically or physically with either the parison material or the walls of the mold cavity, should remain stable under the temperatures typically encountered during the blow molding process, and should not present a hazard to human health. Preferred embodiments of a barrier material for the present invention are lubricants capable of being applied as a surficial liquid to the wall of the parison. A most preferred embodiment is a liquid such as AP-5, certified for use as a lubricant by the FDA.

A lubricant acting as a barrier material can be applied in a number of ways. One suitable embodiment for application of a lubricant is realized by an apparatus for dipping a suspended parison into a bath of the lubricant barrier material. The wetted parison is then transferred to the proper position in the blow mold for subsequent processing. A drip tray or drip wiping pad can be provided to ensure that excess lubricant is returned to the lubricant bath, assuring economical use of the lubricant barrier material and preventing spread of the lubricant fluid to inappropriate areas.

An alternative embodiment contemplates the use of spray devices to evenly disperse the lubricant barrier material on the surface of a parison. The region about the spray area should have suitable protective barriers, such as walls, fume hoods, or forced drafts in order to prevent unwanted dispersion of the lubricant. The use of spray application is not recommended however for those applications involving containers for foods or beverages. The problem of contamination of the interior of the parison by airborne spray particles of the lubricant makes sanitary use of spray devices problematical unless the application takes place while the mouth of the parison is closed such as by a parison handling device.

A preferred embodiment of the invention that can be used with virtually any blow molding machine without expensive modifications to the blow mold cavity area, and with little danger of contamination utilizes a contoured application pad. An application pad, composed a material suitable for applying a liquid coating of the lubricant to a parison, is constructed so as to conform to the desired areas of the parison the contoured application pad can be constructed in either one piece or a plurality of separate pieces. The application pad can also have either a fixed structure or be rotatable.

Means for supplying the lubricant barrier material to the application pad are also necessary. For limited use, this can be as simple as pouring the lubricant barrier material directly on the applicant pad before use. For long term applications, an automatic system of supplying lubricant barrier material to the application pad is recommended, such as using a rotatable application pad that at some point during rotation encounters a bath of the liquid. Such a rotatable application pad can be rotatably driven either by frictive contact with parisons laterally moving across the edges of the application pad, or by a drive mechanism that causes rotation of the application pad. For continuous use, the amount of lubricant barrier material applied to the parison should not exceed the amount of lubricant barrier material supplied to the application pad.

It is accordingly an object of the present invention to provide a method for the application of a barrier material that prevents the premature freezing of a blown parison to the walls of a blow mold cavity.

It is a further object of this invention to provide a method for the blow molding of objects having a a high aspect ratio elliptical horizontal cross section.

Another object of this invention is to provide a method for the prevention of sprue migration in blown plastic parisons.

It is also an object of this invention to provide a method for ensuring that a blown container has substantially uniform wall thickness, with no abnormal thinning or thickening of the walls.

Another object of this invention is to provide a method for applying a lubricant that acts as a barrier material between a parison and the walls of a blow mold.

BRIEF DESCRIPTION OF THE DRAWINGS

Various features and advantages of the invention will become apparent to those skilled in the art upon consideration of the following detailed descriptions of preferred embodiments exemplifying the best mode of carrying out the invention as presently perceived. The detailed description particularly refers to the accompanying figures in which:

FIG. 1 is a view of a blown container and a dotted line indicating the size and position of a parison before the container is blown;

FIG. 2 is a horizontal cross sectional view of a blow mold showing the original placement of the parison and two representative positions of the parison walls during expansion;

FIG. 3 is a partial cross sectional view of a fixed application pad contoured to fit a parison transported in contact with the application pad;

FIG. 4 is view of a contoured, mechanically driven rotary application pad;

FIG. 5 is a view of a rotary application pad, friction driven by the transport of parisons attached to a separate conveyor;

DETAILED DESCRIPTION OF THE INVENTION

Figure 6:
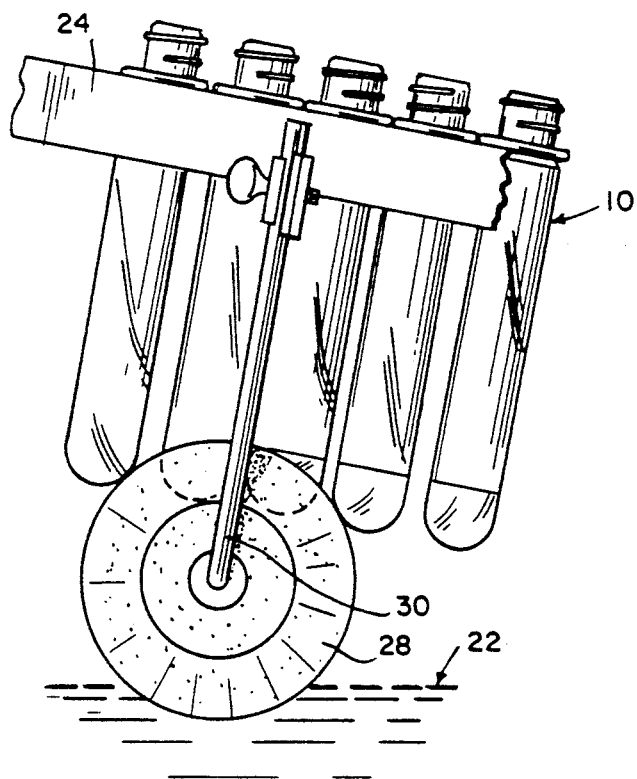
FIG. 6 is a side view of a friction driven rotary application pad.

A side view of a blown container 12 is shown in FIG. 1. The size and position of a parison 10 in relation to the blown container 12 is indicated by the dotted line. The shape of the blown container 12 is similar to the shape of containers commonly used in the food industry to contain salad dressings of various kinds. The upper region of the blown container 12 has screw threading 13 suited for accepting a corresponding threaded cap (not shown) in order to seal the container. A horizontal cross section taken in the region about screw threading 13, such as indicated by line a-b, would reveal a substantially circular wall structure of the blown container 12 in that area. A horizontal cross section taken in the lower regions of the blown container 12, such as indicated by line c-d, would reveal a substantially elliptical wall structure having a high aspect ratio. The particular shape of the illustrated container 12 is not intended to limit the invention, but rather is intended merely to illustrate an example of a container having a high aspect ratio cross section.

For the purposes of this invention, aspect ratio is defined as the resultant of the division of the length of the major axis by the length of the minor axis of a container. The container shape does not have to exactly correspond to a rigorously defined geometrical ellipse, but can be any closed figure. For example, as those skilled in the art can appreciate, a substantially rectangular figure has a well defined aspect ratio equal to the length of the rectangle divided by its width. A similar aspect ratio value can be derived for irregular or varying container cross sectional shapes by determining the average minimal and maximal lengths of the cross section of the container. A blown container 12 has a low aspect ratio if the aspect ratio is between about 1.0 to 1.1. A low aspect ratio ellipse may be considered to be substantially circular. A blown container 12 has a moderate aspect ratio if it has a ratio of major axis length to minor axis length of between about 1.1 to 1.7. A high aspect ratio blown container 12 has an aspect ratio more than about 1.7. By utilization of the term "aspect ratio" no limitation is set on the variety of shapes of containers that can be injection blow molded by the use of this invention.

The blow molding process may be understood by referring to FIG. 2, which shows a cross section of a blow mold 14 used to form the blown container 12 shown in FIG. 1. The horizontal cross section of the blow mold 14 shown in FIG. 2 is the portion that forms the corresponding part of blown container 12 indicated by line c-d. FIG. 2 also shows a cross sectional view of parison 10 in a mold cavity 15 that corresponds to the parison 10 indicated by the dotted lines in FIG. 1.

The blow molding process involves the fixed placement of the parison 10 in the mold cavity 15 formed by the blow mold 14. High pressure air is injected into the interior of parison 10, causing the parison to expand. The wall of parison 10 thins during this expansion, as can be seen by noting the relative wall thicknesses of parison 10 before expansion, and the parison at later times, as illustrated by parison 10a and parison 10b. The expansion is ideally uniform so that the wall thickness of the end product, the blown container 14, is also uniform. If the wall thickness is not substantially uniform, the blown container is potentially useless because of the high probability of containment failure in any thin wall sections. Even if adequate wall thickness is maintained, a non-uniformity of wall thickness could entail unsightly optical distortions that would render the blown container 14 unsuitable for use.

A common cause of non-uniformity in wall thickness of high aspect ratio containers such as blown container 12 can be attributed to the freezing contact of the expanding plastic material of parison 10 with the mold wall 16. Upon direct contact with the mold wall 16 the plastic material of parison 10a freezes, changing from a semi-fluid plastic state to a glassy or partially crystallized state. That portion of the material which is frozen is effectively removed from the amount of material available to continue expansion, since only non-frozen plastic material is capable of expansion. As the parison 10a continues to expand due to internal air pressure, still more material is frozen by direct contact with the mold wall 16, further diminishing the amount of still semi-fluid plastic material that can expand in the mold cavity 15. The end result is a blown container 12 that has abnormally thick walls in the areas near the intersection of the minor axis and the wall of the blown container 12, which came in first contact with the mold wall 16, and abnormally thin walls near the intersection of major axis and the wall of the blown container 12.

The present invention alleviates the problem of wall thinning due to freezing of the material comprising parison 10 by the placement of a barrier layer (not shown in FIG. 2) between the parison 10 and the mold wall 16. A preferred embodiment of a barrier layer is a liquid lubricant that does not significantly react either physically or chemically with either the material composing parison 10 or the mold wall 16. A more preferred embodiment is a liquid lubricant safe for use with foods or beverages, such as silicon lubricants or edible oils. A most preferred embodiment of a barrier material is a liquid lubricant such as AP 5, which does not leave a sticky residue that could necessitate periodic cleaning of the blow mold 14.

Various methods can be used to coat desired areas of the parison 10 with a lubricant prior to placement of the parison 10 in the blow mold 14. A simple method contemplates the use of a wicking application pad 18, contoured to match the surface profile of the areas of a parison 10 which are to be coated with a lubricant 22 for use as a barrier material. A conveyor system laterally transports the parison 10 so that contact with the contoured areas of wicking application pad 18 is momentarily maintained, permitting the transfer of lubricant 22 to predetermined areas of parison 10. The wicking application pad 18 is constructed of an absorbent material that has a wicking uptake of lubricant 22 contained in lubricant container 20 sufficient to ensure a continual supply of lubricant 22 to the contoured surface of application pad 18.

An alternative embodiment for application of a lubricant to a parison 10 involves the use of a rotating application pad 28 as illustrated in FIG. 4. The rotating application pad 28 is contoured to match the parison 10 surface in the desired areas for coating with a lubricant 22. A rotating drive means 26 is used to cause rotation of the rotating application pad 28. The rotating application pad 28 is supported for rotation by an application pad support 30 acting as an axle means for the rotating application pad 28. A rotating drive 32, which can be an electric motor or other device capable of imparting a rotary force, causes rotation of a drive pulley 34. This rotary motion is communicated by means of a drive belt 36 to the rotating application pad 28. The revolution speed of rotating drive 32 can be determined so that partial, single or multiple revolutions of the rotating application pad 28 occur when the parison 10 is in contact during its lateral transport across the contoured surface of the rotating application pad 28. In operation, the rotating application pad 28 is partially immersed in a bath of lubricant 22.

Alternative embodiments of a rotating drive are also contemplated. For example, direct mounting of the rotating application pad 28 on a drive pulley 34 without an intermediary drive pulley would also ensure rotation of the rotating application pad 28. Other means of causing rotation of a rotating application pad 28 can be readily envisaged by those skilled in the art.

The use of a rotating drive means 26 is not necessary for the operation of this invention. FIG. 5 illustrates a rotating application pad 28 that is not driven by a rotating drive means 26. The rotating application pad 28 is axially supported by an application pad support 30 that permits free rotation of the rotating application pad 28. The lower portion of the rotating application pad 28 is immersed in a bath of lubricant 22. The frictional forces generated by the substantially tangential transport of a parison 10 by parison conveyor 24 act to rotate the rotating application pad 28 in such a manner that a continuous supply of lubricant 22 is transferred to application pad 28, and from there the lubricant 22 is applied to parison 10. A side view of a rotatable application pad 28 that is not driven is illustrated in FIG. 6. The use of a conveyor belt to tangentially move multiple parisons across the contoured surface of the rotatable application pad 28 is shown.

Figure 7:
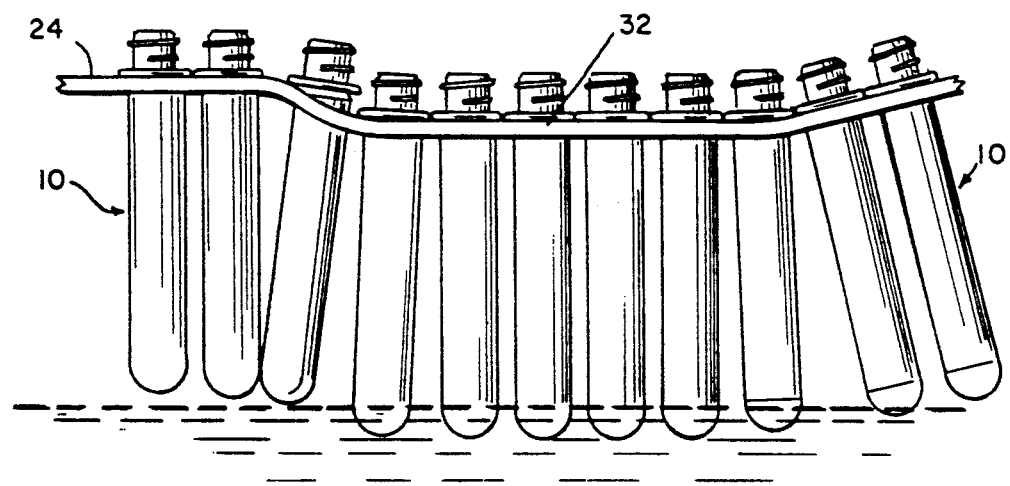
FIG. 7 is a view of a dipping application bath.

However, application pads are not a necessary part of this invention. Alternative means of applying a barrier material such as lubricant 22 to a parison are contemplated. Spray devices are well suited for high speed continuous coating purposes, such as are envisioned for operation of the present invention but pose significant problems in terms of control of over spray as previously discussed. In the alternative, dipping methods such as that illustrated in FIG. 7 could suffice to coat the desired areas of a parison 10 with a lubricant 22. In FIG. 7, a parison conveyor 24 having a dipping section 32, dips a parison into a bath of the lubricant 22 before transport of the parison 10 to a blow mold (not shown).

As shown in FIGS. 3-7, the parison has a circular vertical wall ending in a closed rounded bottom portion. The coating is applied to at least the closed bottom rounded bottom portion. The vertical extent of the coating on the parison is only a minor portion of the entire length of the parison. In fact, this minor portion is significantly less than half the vertical extent of the parison.

It is contemplated that the previously described method will have diverse embodiments adapted for particular uses or environments. The particular embodiments previously described are not intended to limit the scope of the invention, and it is intended that the following claims will encompass alternative and equivalent embodiments of the invention.

I claim as my invention:

1. A method for enhancing the uniformity of wall thickness of an article having a high aspect ratio horizontal cross section of greater than about 1.7 and produced from a parison having a closed bottom in a blow molding process comprising the steps of:

providing a blow molding apparatus which forms a finished article having a high aspect ratio horizontal cross section of greater than about 1.7;

providing a supply of parisons of a given vertical extent for forming articles in a blow molding apparatus;

applying a barrier layer to the closed bottom and a selected vertical extent of the outer surface of each parison which is substantially less than the entire given vertical extent of each parison, prior to its introduction into the blow molding apparatus; and inserting the parison having the barrier layer in the blow molding apparatus and blow molding, the barrier layer being effective to prevent premature freezing of the blown parison upon contact with a wall of the blow molding apparatus during blow molding.

2. The method of claim 1 wherein the barrier layer is a lubricant and the applying step comprises applying the lubricant to the closed bottom and selected vertical extent of the outer surface of the parison by dipping said parison in a lubricant dipping bath.

3. The method of claim 1 wherein the barrier layer is a lubricant and the applying step comprises applying the lubricant to the closed bottom and selected vertical extent of the outer surface of the parison with an application pad means.

4. The method of claim 3 wherein the applying step further comprises a step of immersing a lower portion of the application pad means in a bath of lubricant.

5. The method of claim 4 wherein the applying step further comprises a step of permitting the application pad means to rotate about a generally horizontal axis.

6. The method of claim 5 wherein the permitting step comprises a step of powering the rotation of the application pad means.

7. A method for enhancing the uniformity of wall thickness of an article having a high aspect ratio horizontal cross section of greater than 1.7 and produced from a parison with a sprue artifact on a closed bottom portion in a blow molding process comprising the steps of:

providing a supply of parisons of a given vertical extent for forming articles in a blow molding apparatus; and applying a barrier layer to the closed bottom portion and a selected vertical extent of the parison which is substantially less than the entire given vertical extent of the parison, and blow molding the parison having the barrier layer within a mold having high aspect ratio horizontal cross section of greater than 1.7, the barrier layer being effective to prevent migration of the sprue artifact during blow molding.

8. A method as described in claim 7 wherein the selected vertical extent of the parison to which the barrier layer is applied is substantially less than half the vertical extent of the entire parison.

* * * * *